(12) United States Patent
Wynne et al.

(10) Patent No.: US 7,612,537 B2
(45) Date of Patent: Nov. 3, 2009

(54) GALVANICALLY ISOLATED CHARGE BALANCE SYSTEM

(75) Inventors: John Wynne, Lisnalty (IE); Eamon Hynes, Raheen (IE)

(73) Assignee: Analog Devices, Inc., Norwood, MA (US)

( * ) Notice: Subject to any disclaimer, the term of this patent is extended or adjusted under 35 U.S.C. 154(b) by 458 days.

(21) Appl. No.: 11/657,824

(22) Filed: Jan. 25, 2007

(65) Prior Publication Data

US 2008/0180063 A1    Jul. 31, 2008

(51) Int. Cl.
*H02J 7/00* (2006.01)
(52) U.S. Cl. .......................... 320/134; 320/136; 320/166
(58) Field of Classification Search ................. 320/134, 320/135, 136, 166
See application file for complete search history.

(56) References Cited

U.S. PATENT DOCUMENTS

| 4,740,966 | A | 4/1988 | Goad | |
|---|---|---|---|---|
| 6,975,193 | B2 | 12/2005 | Knieser et al. | |
| 2004/0135546 | A1* | 7/2004 | Chertok et al. | 320/118 |

2006/0153495 A1    7/2006   Wynne et al.

OTHER PUBLICATIONS

Jung, Do Yang, "Shield Ultracapacitor Strings From Overvoltage Yet Maintain Efficiency", Electronic Design Magazine, May 27, 2002, pp. 81-85.
"Cell balancing packs a punch", CIS Magazine, Nov. 2003, pp. 27-30.
Intersil Preliminary Datasheet for X3100, X3101, Apr. 11, 2005.
Intersil Applications Note, "The Benefits of Cell Balancing", Jul. 8, 2005, pp. 1-9.
Intersil Applications Note, Using Cell Balancing to Maximize the Capacity of Multi-cell Li-Ion Battery Packs, Jun. 7, 2005, pp. 1-8.

* cited by examiner

*Primary Examiner*—Edward Tso
*Assistant Examiner*—Aaron Piggush
(74) *Attorney, Agent, or Firm*—Kenyon & Kenyon LLP

(57) ABSTRACT

A galvanically isolated charge balance system for a multicell battery includes a balancing circuit associated with each cell; each balancing circuit including a flying capacitor; a variable conductance switch; and a biasing circuit for the variable conductance switch; and a galvanically isolating MEMS switching device for selectively connecting the flying capacitor to a voltage supply to charge it to a predetermined voltage and to the biasing circuit for setting the variable conductance switch to adjust the charge on its associated cell to a preselected level.

9 Claims, 4 Drawing Sheets

GALVANICALLY ISOLATED CHARGE BALANCE SYSTEM

FIELD OF THE INVENTION

This invention relates to a galvanically isolated charge balance system.

BACKGROUND OF THE INVENTION

In one approach charge balancing circuits (passive) discharge one or more cells of a battery to bring all of the cells into balance to improve battery life. Typically this is done by controlling the leakage current from each cell individually. For example, a transistor switch and series resistance are configured in parallel with each cell. The switch is turned on for a predetermined time depending on the over charge of the associated cell, e.g. the greater the over charge the longer the switch is held on to continue the discharge. One shortcoming with this is that, in a multicell battery where only one or a few cells are under charged, it is inefficient to discharge the majority of cells to bring them down to the charge level of the few undercharged. Another approach (active) is to apply a charge, e.g. via a flying capacitor to the one or few cells that are under charged to bring them up to the charge levels of the others. This requires a complex matrix of switches to selectively apply the charge to the cells which are under charged.

BRIEF SUMMARY OF THE INVENTION

It is therefore an object of this invention to provide an improved galvanically isolated charge balance system.

It is a further object of this invention to provide such an improved galvanically isolated charge balance system which can employ an on-off and/or linear control for balancing charge.

The invention results from the realization that an improved, galvanically isolated charge balance system for a multicell battery, which operates either actively or passively (charge or discharge) is achieved using a galvanically isolated MEMS switch for selectively connecting a flying capacitor to a voltage supply to charge an associated cell to a predetermined voltage and to a biasing circuit for setting a variable conductance switch to adjust the charge on the associated cell to a preselected level.

The subject invention, however, in other embodiments, need not achieve all these objectives and the claims hereof should not be limited to structures or methods capable of achieving these objectives.

This invention features a galvanically isolated charge balance system including a balancing circuit associated with each cell of the battery, each balancing circuit including a flying capacitor and a variable conductance switch. There is also a biasing circuit for the variable conductance switch and a galvanically isolating MEMS switching device for selectively connecting the flying capacitor to a voltage supply to charge it to a predetermined voltage and to the biasing circuit for setting the variable conductance switch to adjust the charge on its associated cell to a preselected level.

In a preferred embodiment the variable conductance switch may include a transistor. The transistor may include a MOSFET. The biasing circuit may include a capacitor. The predetermined voltage may set the variable conductance switch to discharge the cell to the predetermined level. The predetermined voltage may set the variable conductance switch to charge the cell or allow the cell to be charged to the predetermined level. The predetermined voltage may set the variable conductance switch to charge the cell to the predetermined level with a current level which is a predetermined percentage of an external current source.

The invention also features a galvanically isolated charge balance system including a balancing circuit associated with each cell of a multi-cell battery. Each balancing circuit includes a flying capacitor, a variable conductance switch, and a biasing circuit for the variable conductance switch. A galvanically isolating MEMS switching device selectively connects the flying capacitor to a voltage supply to charge it to a predetermined voltage and to the biasing circuit for setting the variable conductance switch to discharge its associated cell to a preselected level.

The invention also features a galvanically isolated charge balance system including a balancing circuit associated with each cell of the multi-cell battery. Each balancing circuit includes a flying capacitor, a variable conductance switch, and a biasing circuit for the variable conductance switch. A galvanically isolating MEMS switching device selectively connects the flying capacitor to a voltage supply to charge it to a predetermined voltage and to the biasing circuit for setting the variable conductance switch to charge its associated cell to a preselected level.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
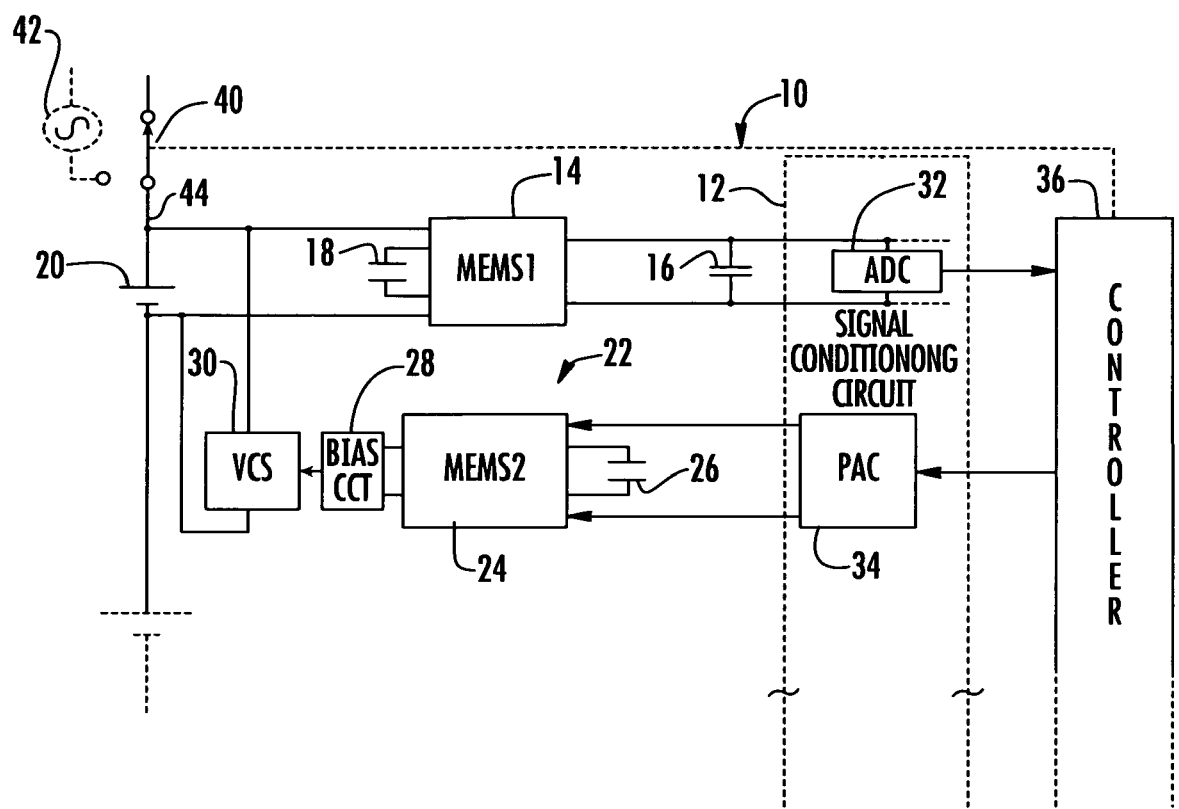
FIG. 1 is a schematic block diagram of a galvanically isolated charge balance system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a galvanically isolated signal conditioning system 10 including signal conditioning circuit 12 and MEMS device 14 along with flying capacitor 18 and hold capacitor 16 which serves one battery cell 20 of a number of battery cells not shown. Also shown in FIG. 1 is a galvanically isolated charge balance system 22, according to this invention, including MEMS device 24, flying capacitor 26, bias circuit 28, and variable conductance switch 30. Although there is only one cell 20 shown in FIG. 1, along with one signal conditioning system 10 and one charge balance system 22 there is typically a number of cells each having associated with it a galvanically isolated signal conditioning system and galvanically isolated charge balance system according to this invention. Signal conditioning circuit includes, among other things, analog to digital converter 32 and digital to analog converter 34, also shown is a controller 36.

In operation MEMS 14 charges flying capacitor 18 to a predetermined voltage, such as representative of the cell voltage from battery cell 20 and then switches flying capacitor 18 to charge hold capacitor 16. The voltage on hold capacitor 16 is then supplied to ADC 32 and via signal conditioning circuit 12 to a controller such as 36. As each cell is used to apply a voltage to hold capacitor 16, controller 36 looks to ADC 32 to determine the value of the charge on that cell. In this way controller 36 monitors the voltage on each of the battery cells and determines the charge state of each. In order to balance the charge on all of the battery cells, controller 36 can either act actively to add charge to the cells that are below a preselected charge level or act in a passive mode to drain or discharge battery cells that are above the preselected level.

Galvanically isolated charge balance system 22 according to this invention can be applied in either case. For example, assume that controller 36 is operating in a passive mode and that all the battery cells are at a preselected level lower than that of battery cell 20. Therefore, battery cell 20 is discharged to that lower preselected level. In this case controller 36 commands DAC 34 to provide a predetermined voltage to flying capacitor 26, which, when switched by MEMS device 24 to be applied to bias circuit 28, causes variable conductance switch 30 to drain off just enough charge from cell 20 to bring it down to the preselected level. In accordance with the preferred embodiment variable conductance switch 30 is a linear switch i.e., it can have not only on and off states but various conduction levels between on and off. Actually there may be a number of cells that are above the preselected level and they may be at different levels above the preselected level. The adjustment needed and the resultant predetermined voltage required to be applied to flying capacitor 26 is a matter of design and under the supervision of controller 36 which is not a part of this invention.

Alternatively, in active mode, assuming that battery cell 20 is the only one below a preselected level of charge, DAC 34 is commanded to provide a voltage on flying capacitor 26 which when applied to bias circuit 28 causes variable conductance switch 30 to create a conductive path across battery cell 20 which is less than the conductive paths across each other battery cell in the battery string. This is typically done by controller 36 changing the state of switch 40 to connect it to a current source 42. This current source may for example provide a one amp charge current on line 44 to battery cell 20 and all of the battery cells in series with it. DAC 34 then, for example, might provide a voltage to flying capacitor 26 such that variable conductance switch 30 is completely off and the entire charging current goes through battery cell 20 while the voltage applied to all of the rest of the battery cells causes their variable conductance switches to shunt 3% of the current through the variable conductance switch and only the remaining 97% through their respective battery cells. In this way battery cell 20 will charge up at a faster rate than the remaining battery cells to reach the required charge level. The predetermined voltage may set the variable conductance switch to charge the cell to a predetermined level which is a predetermined percentage of an external current source.

Figure 2:
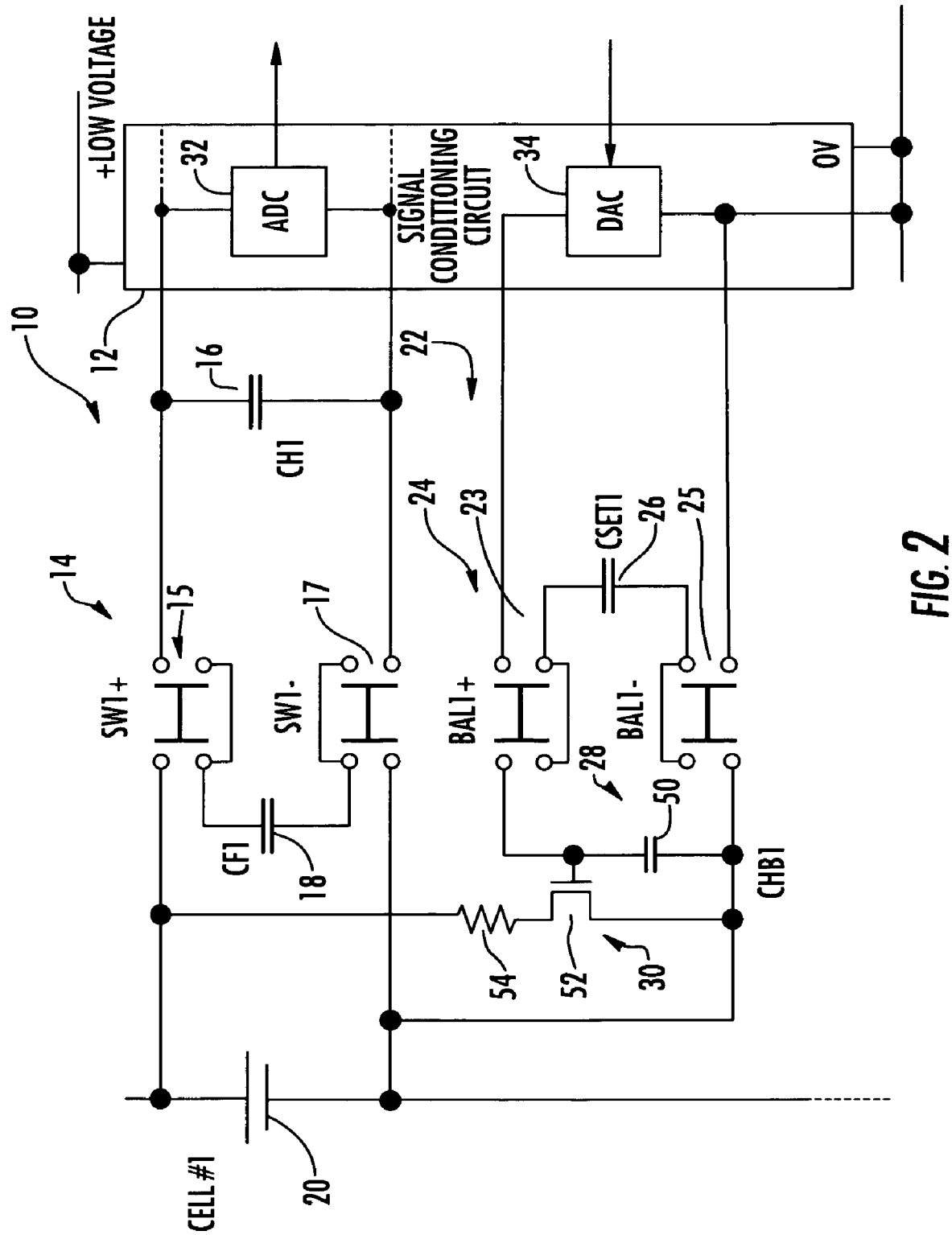
FIG. 2 is more detailed view of the system of FIG. 1.

The systems of FIG. 1 are shown in greater detail in FIG. 2 where it can be seen that MEMS device 14 includes two MEMS switches 15 and 17 and MEMS device 24 includes MEMS switches 23 and 25. Here biasing circuit 28 includes a capacitor 50 and the variable conductance switch 30 includes a CMOS transistor 52 and a current limiting resistance 54.

Figure 3:
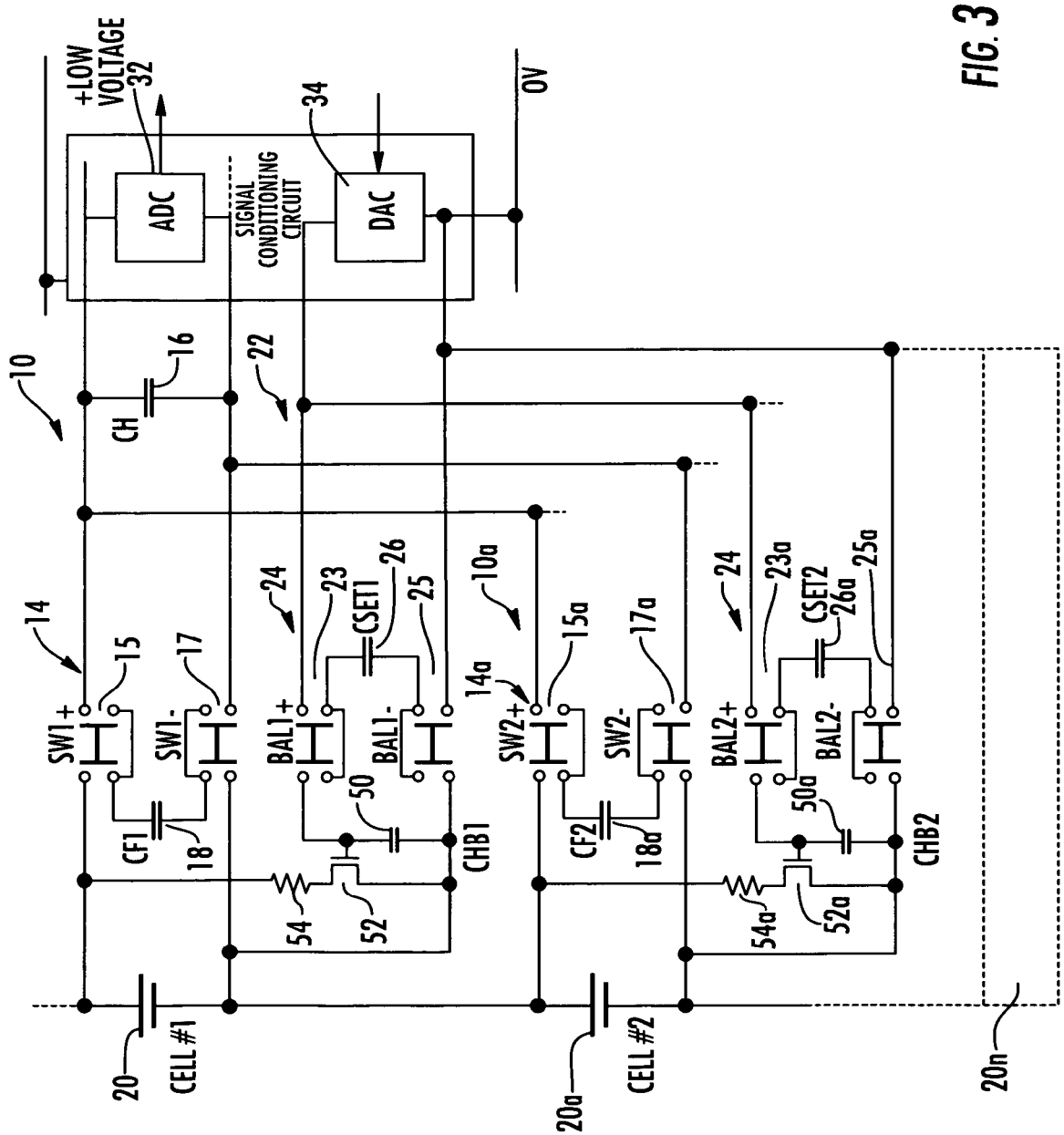
FIG. 3 is a view similar to FIG. 2 showing an additional cell and associated circuits.
Figure 4:
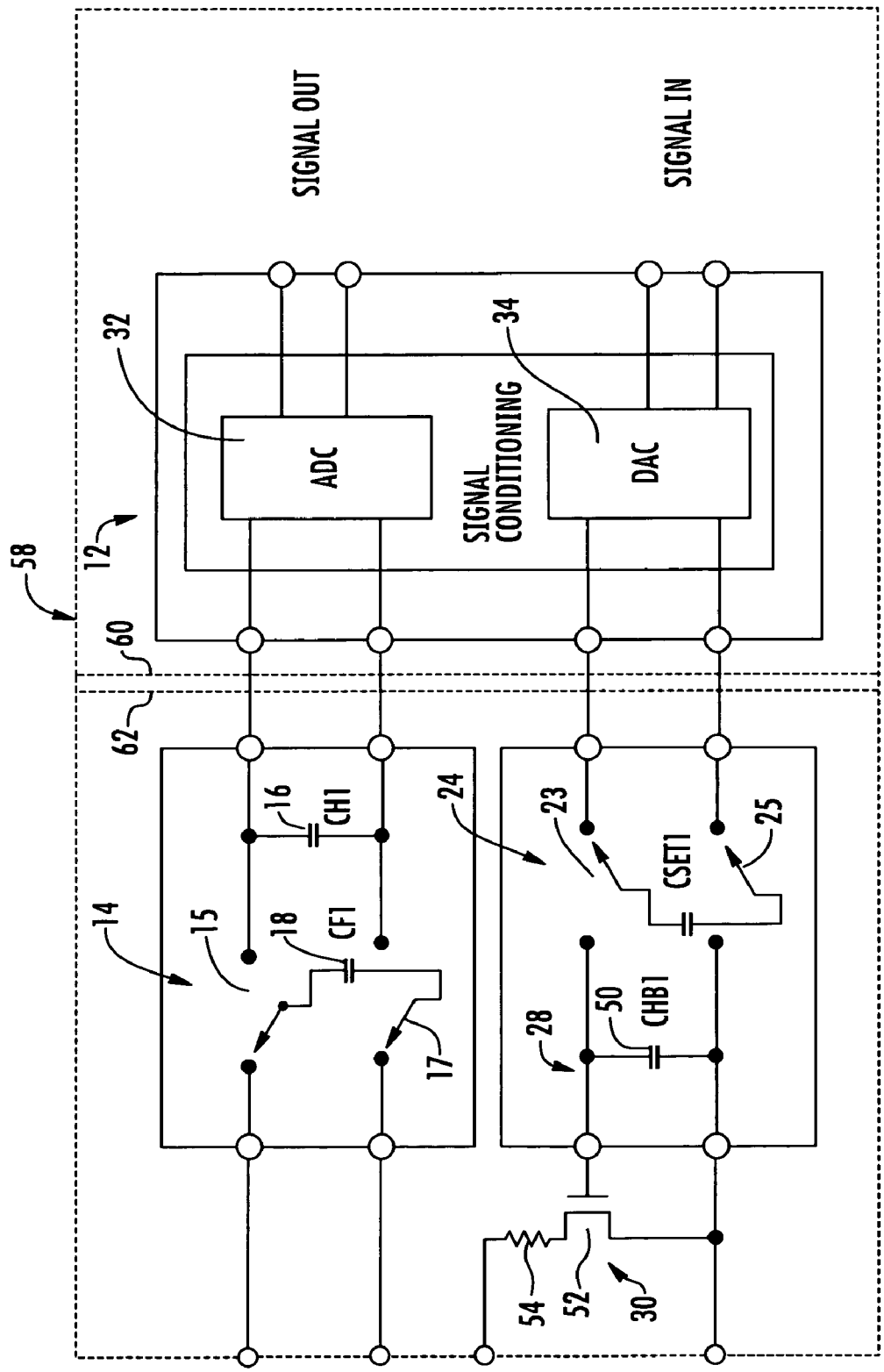
FIG. 4 is a schematic diagram showing the MEMS devices and signal conditioning circuit on adjacent chips or a single chip.

FIG. 3 illustrates that with a number of battery cells 20-20$n$ the configuration is simply replicated while using the same holding capacitor 16 to provide the output voltage from the battery cells and the same DAC 34 to provide the input voltages to flying capacitors 26-26$n$. The physical construction of one embodiment of the invention is shown in FIG. 4 where the signal conditioning circuit 12 and the MEMS switching devices 14 and 24 are mounted on a single chip 58 such as an SOI chip or there could be two chips 60, 62 with signal conditioning circuit 12 formed on CMOS chip 60 and MEMS switches 14, 24 formed on SOI chip 62, adjacent to one another and interconnected by wire bonds. A more detailed disclosure of the galvanically isolated signal conditioning system and the MEMS structure is shown in U.S. patent application Ser. No. 11/005,608, filed Dec. 6, 2004 by the same inventors and having the same assignee as the instant case herein incorporated in its entirety by this reference.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A galvanically isolated charge balance system for a multicell battery comprising:
    a balancing circuit associated with each cell; each balancing circuit including a flying capacitor; a variable conductance switch; and a biasing circuit for said variable conductance switch; and
    a galvanically isolating MEMS switching device for selectively connecting said flying capacitor to a voltage supply to charge it to a predetermined voltage and to said biasing circuit for setting said variable conductance switch to adjust the charge on its associated cell to a preselected level.

2. The galvanically isolated charge balance system of claim 1 in which said variable conductance switch includes a transistor.

3. The galvanically isolated charge balance system of claim 2 in which said transistor includes a MOSFET.

4. The galvanically isolated charge balance system of claim 1 in which said biasing circuit includes a capacitor.

5. The galvanically isolated charge balance system of claim 1 in which said predetermined voltage sets said variable conductance switch to discharge said cell to said predetermined level.

6. The galvanically isolated charge balance system of claim 1 in which said predetermined voltage sets said variable conductance switch to charge said cell to said predetermined level.

7. The galvanically isolated charge balance system of claim 1 in which said predetermined voltage sets said variable conductance switch to charge said cell to said predetermined level with a current level which is a predetermined percentage of an external current source.

8. A galvanically isolated charge balance system for a multicell battery comprising:
- a balancing circuit associated with each cell; each balancing circuit including a flying capacitor; a variable conductance switch; and a biasing circuit for said variable conductance switch; and
- a galvanically isolating MEMS switching device for selectively connecting said flying capacitor to a voltage supply to charge it to a predetermined voltage and to said biasing circuit for setting said variable conductance switch to discharge its associated cell to a preselected level.

9. A galvanically isolated charge balance system for a multicell battery comprising:
- a balancing circuit associated with each cell; each balancing circuit including a flying capacitor; a variable conductance switch; and a biasing circuit for said variable conductance switch; and
- a galvanically isolating MEMS switching device for selectively connecting said flying capacitor to a voltage supply to charge it to a predetermined voltage and to said biasing circuit for setting said variable conductance switch to charge its associated cell to a preselected level.

* * * * *